United States Patent
Mazuet et al.

[11] Patent Number: 6,043,885
[45] Date of Patent: Mar. 28, 2000

[54] FRINGE DEFLECTOMETRY APPARATUS AND METHOD

[75] Inventors: Denis Mazuet, Paris; Patrick Bertrand, Issy-les-Moulineaux; Do Quyen Phan, Chauconin-Neufmontiers, all of France; Werner Mohr, Zwiesel, Germany

[73] Assignee: Essilor International, Charenton Cedex, France

[21] Appl. No.: 09/004,226

[22] Filed: Jan. 8, 1998

Related U.S. Application Data

[63] Continuation-in-part of application No. PCT/FR96/00187, Jul. 12, 1996.

[51] Int. Cl.[7] ................ G01B 9/02; G01B 9/00
[52] U.S. Cl. ............. 356/354; 356/127; 356/124
[58] Field of Search ................ 356/354, 124, 356/125, 126, 127

[56] References Cited

U.S. PATENT DOCUMENTS

| | | | |
|---|---|---|---|
| 5,066,119 | 11/1991 | Bertrand | 356/124 |
| 5,581,347 | 12/1996 | Le Saux et al. | 356/124 |

FOREIGN PATENT DOCUMENTS

0 644 411 A1  3/1995  European Pat. Off. .

*Primary Examiner*—Robert H. Kim
*Assistant Examiner*—Andrew H. Lee
*Attorney, Agent, or Firm*—Fish & Richardson P.C.

[57] ABSTRACT

A fringe deflectometry apparatus illuminates an optical component to be measured using radiation with a known wavefront, deflects the radiation after it has been reflected or transmitted by the optical component to be measured, and materializes a reference ray. Transverse aberration of the reference ray after reflection or transmission by the optical component is measured. A deflectometry method using the apparatus enables an absolute phase reference to be provided.

21 Claims, 3 Drawing Sheets

FRINGE DEFLECTOMETRY APPARATUS AND METHOD

This application is a continuation-in-part of PCT/FR96/00187 filed Jul. 12, 1996.

BACKGROUND OF THE INVENTION

The present invention relates to fringe deflectometry apparatus, comprising means for illuminating an optical component to be measured with radiation of a known wavefront; means for deflectometric measurement of said radiation after reflection or transmission thereof by said optical component to be measured, and means for materializing a reference beam.

The invention also relates to a method for fringe deflectometry, comprising steps consisting in illuminating an optical component to be measured with radiation having a known wavefront, and analyzing, in deflectometric measurement means, the fringes generated by the radiation reflected or transmitted by said component.

The invention also covers the application of this method to the measurement of ophthalmic lenses, lenses having a refractive index gradient and ophthalmic lens molds.

The methods of the invention apply in fringe deflectometry apparatus in which there is no phase reference, such as for example differential interferometry, moiré pattern deflectometry or deflectometry by the Ronchi method.

A deflectometry apparatus using reflection or transmission is disclosed in FR-A-2,710,162 and EP-A-0,644,411 in the name of the applicant. This apparatus makes it possible to measure, using reflection or transmission, the geometrical structure of an optical component.

The principle of such a measurement apparatus is that of illuminating the optical component to be measured, using radiation having a known wave surface, and, in the simplest case, illuminating it with a spherical wave, and then measuring the shape or form of the wave surface after reflection or transmission at the optical component to be measured. Wave surface measurement after reflection or transmission makes it possible to work backwards to arrive at the geometrical characteristics of the component to be measured.

The invention applies also to the apparatus described in FR-A-2,747,912 and FR-A-2,647,913.

Reference is explicitly made to the above documents for more details regarding the measurement principle and a possible device for carrying out such measurement.

The invention applies to fringe deflectometry apparatus, using transmission as well as reflection. Generally speaking, it makes it possible to measure the inclination or tilt of a surface of a wave with respect to the optical axis of the apparatus. Such inclination results, in a fringe deflectometry method, in a phase term comprised between $-\pi$ and $\pi$, which is determined by phase detection, and by a multiple of $2\pi$ phase term, which is not given by the phase detection method. The invention makes it possible to overcome this uncertainty.

Where the setup described in documents FR-A-2,710,162 and EP-A-0,644,411 is employed using reflection, it is not necessary to measure the inclination of the wave surface after reflection; autocollimation at one point on the surface makes it possible to provide a phase reference. The invention can allow this operation to be avoided.

When the setup in FR-A-2,710,162 and EP-A-0,644,411 is used in transmission, a new technical problem arises.

This problem is that of determining the prism that exists between the two faces of the component. The devices of the above documents can indeed operate in transmission, for components having an optical axis, always provided the position of this optical axis is known—in this case, the prism on the optical axis is known and is equal to zero, thereby providing a phase reference. If the optical axis is not known, or if the component has no optical axis, one could imagine, if needs be, measurement of the prism by introducing prism gauges following the component to be measured; this method would suffer from a lack of accuracy, would require time to implement, and would additionally involve aligning the first face of the component.

To sum up, known apparatuses, when used in transmission, do not make it possible to readily achieve measurement of the prism existing between the input and output faces of the component. This new problem occurs for any component, notably for measurement of a constant index dioptric component, or for a parallel-sided graded index plate. The solution to this problem amounts to supplying, in deflectometric apparatus using transmission, a phase reference for the deflectometric analysis means.

The invention sets out to resolve these technical problems.

SUMMARY OF THE INVENTION

The invention thus provides fringe deflectometry apparatus comprising -means for illuminating an optical component to be measured using radiation with a known wavefront, deflectometry means for said radiation after reflection or transmission thereof by said optical component to be measured, and means for materializing a reference ray, characterized in that it further comprises means for measuring transverse aberration of said reference ray after reflection or transmission thereof by said optical component to be measured.

According to one embodiment, the means for measurement of transverse aberration of said reference ray are in a channel that is separate from said deflectometry means.

The fringe deflectometry apparatus can comprise a semi-reflecting plate for directing radiation reflected or transmitted by said optical component to be measured firstly to said deflectometry means and, secondly, to said transverse aberration measurement means.

According to one embodiment, said transverse aberration measurement means are in a conjugate optical plane with the plane of said deflectometry means.

The transverse aberration measurement means can comprise a CCD camera and means for acquisition of the position of a spot on an image of said camera.

According to another embodiment, the deflectometry means comprise a Ronchi grating and means for analyzing fringes generated by said grating.

The means for materializing a reference ray can comprise a laser symmetrical with said illumination means with respect to a semi-reflecting plate. In one embodiment, the means for materializing a reference ray materialize a paraxial ray.

The invention also provides a fringe deflectometry method, notably designed to be carried out in the above apparatus, comprising the steps of illuminating an optical component to be measured with radiation of known wavefront, and analyzing, in deflectometry means, the fringes generated by the radiation reflected or transmitted by said component, characterized in that it further comprises the steps of:

measuring, for a ray reflected or transmitted by said component, a reduced phase on said deflectometry means;

measuring transverse aberration of said ray;

calculating absolute phase of said ray by deflectometry means from measurement of said reduced phase, thereby removing uncertainty through measurement of said transverse aberration.

Transverse aberration of said ray can be measured in a reference channel which is different from the channel of said deflectometry means.

According to one embodiment, the method comprises a calibration step consisting in determining a relation between transverse aberration of a ray reflected or transmitted by said component and the slope of said ray in said deflectometry means. This is particularly relevant when the deflectometry method is a method other than the Ronchi method.

In this case, the calibration can comprise the steps of:

illuminating an optical component of variable prism;

moving said component at least twice;

measuring, for each movement of said optical component, and for one ray, transverse aberration and reduced phase on said deflectometry means;

counting, for each displacement of said optical component the number of fringes that pass on said deflectometry means during said movement;

calculating, from said measured and counted values and for each movement of said optical component, a slope of said ray in said deflectometry means;

determining said relation from values of transverse aberration and slope, obtained for each movement.

Alternatively, the calibration step comprises carrying out at least twice, the steps consisting of:

illuminating an optical component of known prism;

measuring, for a ray, transverse aberration of a ray, and reduced phase on said deflectometry means;

calculating a slope of said ray in said deflectometry means from values measured and from a value of prism of said optical component;

and in that said relation is determined from the set of values for transverse aberration and slope thus obtained.

Providing several rays and one single movement or one single optical component having a known prism are equivalent.

In one embodiment, the fringe deflectometry method is a Ronchi method and comprises a calibration stage consisting in determining a relation between transverse aberration of a ray in a reference channel and transverse aberration of this ray in the deflectometry means.

In this case, the calibration step can comprise the steps of:

illuminating an optical component of variable prism;

moving said component at least twice;

measuring, for each movement of said optical component, and for a ray, transverse aberration in said reference channel and reduced phase on said deflectometry means;

counting, for each displacement of said optical component the number of fringes that pass on said deflectometry means during said movement;

calculating from said measured and counted values and for each movement of said optical component, a transverse aberration of said ray in said deflectometry means;

determining said relation from values for transverse aberration in said reference channel and for transverse aberration of said ray in said deflectometry means, obtained for each movement.

The calibration step can alternatively comprise carrying out, at least twice, the steps consisting of:

illuminating an optical component of known prism;

measuring, for a ray, transverse aberration of a ray, and reduced phase on said deflectometry means;

calculating a transverse aberration of said ray in said deflectometry means from values measured and a value of prism of said optical component;

and where said relation is determined from the set of values thus obtained for transverse aberration in said reference channel and transverse aberration in said deflectometry means.

Providing several rays with one single movement, or a component of known prism are equivalent.

According to one embodiment, said relation is a linear function.

In this case, the optical component is preferably moved at least twice.

Finally, the invention also relates to the application of such a method to the measurement of ophthalmic lenses.

Further advantages and characteristics of the invention will become more clear from the description which follows of an embodiment, provided solely by way of example, and with reference to the attached drawings.

DETAILED DESCRIPTION OF PREFERRED EMBODIMENT

The expression, referring to an angle or a phase, "reduced angle or phase" means the value modulo $2\pi$ of the angle or phase which is comprised between $-\pi$ and $\pi$. We shall use the term "absolute angle or phase" for the real value of the angle or phase. For example, a phase $\Phi$ of $7\pi/2$ (absolute phase) corresponds to a reduced phase $\phi$ of $7\pi/2 - 2\pi = -\pi/2$. Below, we shall systematically identify reduced phases by the symbol $\phi$ (small Greek letter phi) and the absolute phases by the symbol $\Phi$ (capital Greek phi). Knowledge only of the reduced phase $\phi$ leaves an uncertainty, ambiguity or indetermination, which is a multiple of $2\pi$ regarding the absolute phase $\Phi$.

Below, we shall give a detailed description of the application of the invention to an apparatus implementing the Ronchi method. In this case, it is advantageous to determine transverse aberration of the rays in the plane of the deflectometry grating. The invention can also be implemented with other methods of fringe deflectometry, in which case it is the slope of the rays, and not the transverse aberration which is determined; this is for example the case when the moiré pattern method is used. Whatever the case may be, determining transverse aberration or ray slope is equivalent, as the slope of the rays is equal to the ratio of transverse aberration and focal length f of the objective lens placed between the component to be measured and the deflectometry means.

Figure 1:
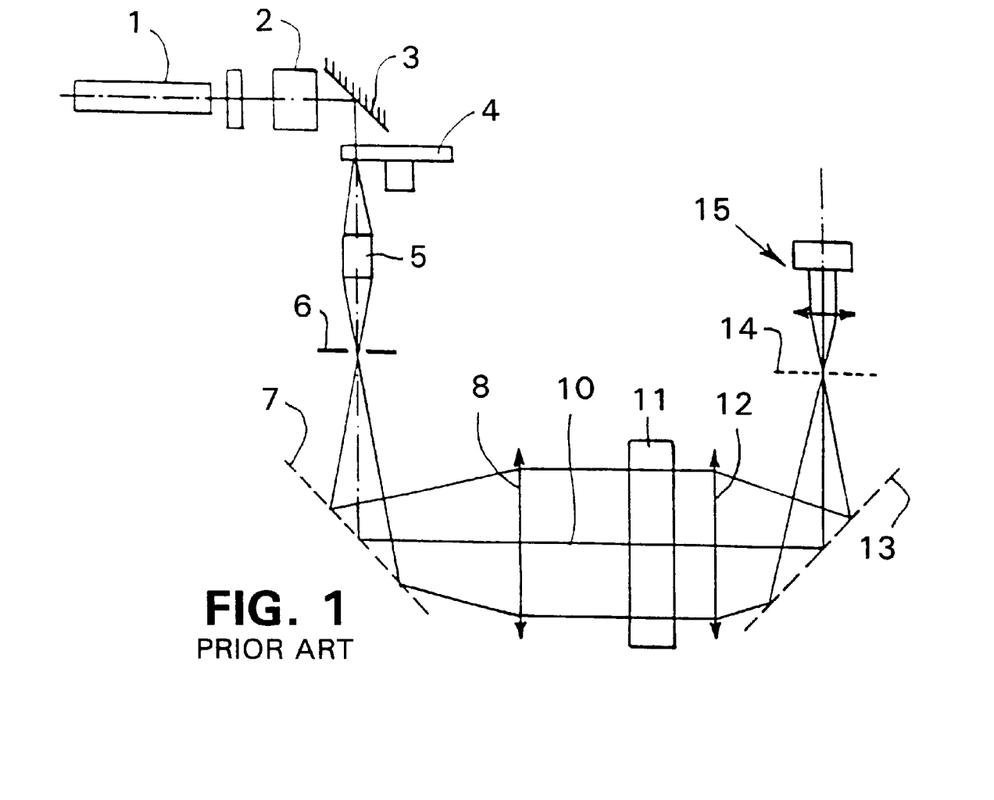
FIG. 1 shows apparatus for carrying out deflectometry, using transmission.

FIG. 1 shows, diagrammatically, apparatus for performing deflectometry using transmission. The apparatus in FIG. 1 comprises means for generating a point source radiation. A wavefront measurement laser 1, provided with a shutter 2, sends a laser beam to a mirror 3. Mirror 3 redirects the laser beam to a rotating ground glass disc 4. The radiation leaving the rotating ground glass disc 4 enters a microscope objective lens 5. After leaving the microscope objective lens 5, the radiation passes through a pinhole 6.

Wavefront measuring laser 1, shutter 2, mirror 3, rotating ground glass disc 4, microscope objective 5 and pinhole 6 constitute means for generating a monochromatic point source of high quality.

The radiation leaving pinhole 6 is directed by a semi-reflecting plate 7 to a first lens 8. The optical axis of lens 8 coincides with optical axis 10 of the measurement apparatus in FIG. 1, and the focus of lens 8 coincides with the point source of the radiation whereby, at the exit from lens 8, a plane wavefront, perpendicular to the optical axis 10 of the apparatus is obtained. Instead of lens 8, one could also use an objective lens providing a wavefront of a known nature at its exit.

A holder 11 is designed to receive an optical component to be measured, and to keep it in position on an optical axis 10. Below, we shall identify the three axes corresponding, respectively, to optical axis 10, to an axis orthogonal in the vertical plane and to a third axis forming an orthonormed reference frame by (x, y, z). Holder 11 advantageously moves along optical axis 10 (axis x) and in a plane perpendicular thereto (axes y and z).

Next, further along optical axis 10, a second lens 12 is located, a semi-reflecting plate 13 redirecting the radiation leaving the second lens to a deflectometric channel, comprising a grating 14 placed on the optical axis, at the focus of said second lens 12. The semi-reflecting plate also directs the radiation towards a reference channel, described with reference to FIG. 4.

Grating 14 consists of a set of alternating black and transparent lines. A wavefront measuring camera 15, for example a CCD camera, picks up the image formed at the exit from the grating on a ground glass screen or an objective lens, not identified in the drawing. The CCD plane is optically conjugated with the exit face of the component to be measured.

The device in FIG. 1 makes it possible to carry out deflectometric analysis, using transmission on an optical component inserted in holder 11, as explained with reference to FIG. 2.

Figure 2:
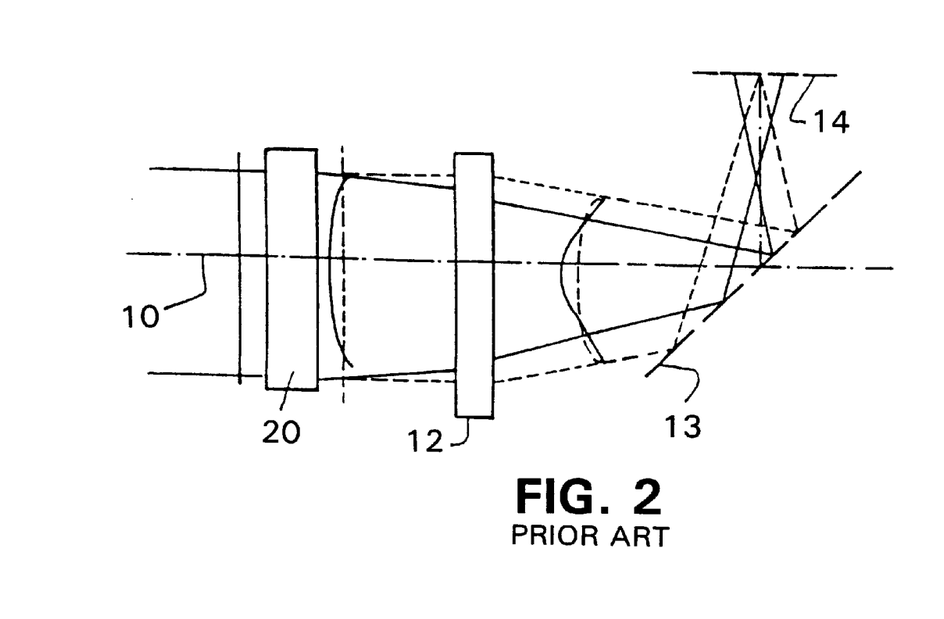
FIG. 2 is a diagrammatical view of part of the apparatus of FIG. 1, for the measurement of a parallel-sided graded index plate.

FIG. 2 is a diagrammatical view of part of the apparatus in FIG. 1, for the case where a parallel-sided plate 20 having a refractive index gradient is being measured. FIG. 2 shows optical axis 10, the second lens 12, the plate 13 and grating 14.

As indicated above, a plane wavefront is encountered at the exit from the first lens. If there is no component in the holder, or where a plate having a constant refractive index is fitted, the second lens 12 receives a plane wavefront and generates a spherical wavefront that converges to a point on grating 14. Depending on whether the point of convergence is or is not situated on a black line of the grating, the spherical wavefront is blocked or transmitted, and the image in camera 15 consists of a uniform flat shade. This situation is shown in dotted lines in FIG. 2.

When a variable refractive index plate 20 or, more generally, any optical component whatsoever, is fitted in the holder, the wavefront after the component is no longer plane, and the radiation leaving second lens 12 no longer converges to a point on the grating: this situation is shown in solid lines on FIG. 2; an image having several fringes will now be able to be seen in the camera. Analyzing these fringes, using a method such as the one described in the above-cited patent applications makes it possible to calculate the slope of the various rays and the shape of the wavefront leaving the second lens, and, by working backwards, those at the output from the component to be analyzed. As described in the above-cited documents, this analysis is done by successively moving the grating along the y axis while turning the grating about the optical axis of the system, and then successively moving the grating along the z axis, and analyzing variations in the fringe system for each movement in the two directions.

Figure 3:
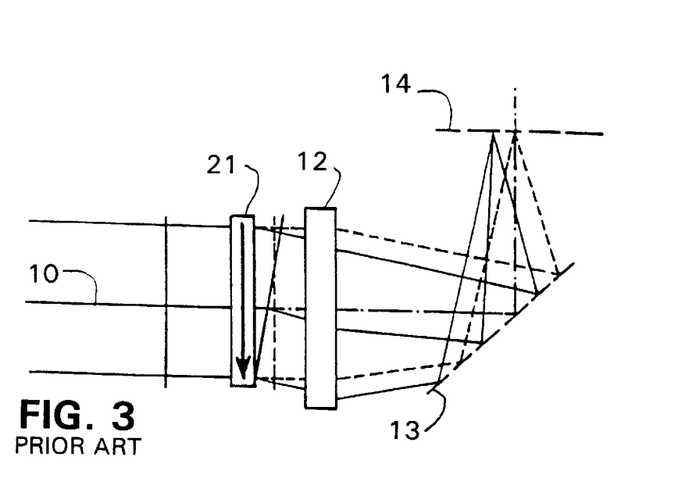
FIG. 3 is a diagrammatical view of part of the apparatus of FIG. 1, for the measurement of a parallel-sided constant index gradient plate.

FIG. 3 is a diagrammatical view of part of the apparatus in FIG. 1, for the case where a parallel-sided plate having a constant refractive index gradient is being measured. The same elements as occurred in FIG. 2 can be seen in FIG. 3; however, the component 21 to be analyzed is a parallel-sided plate having a constant refractive index gradient. In this case, the wavefront after component 21 is plane, making an angle with the optical axis 10 of the setup which is a function of the refractive index gradient. The second lens 12 receives a plane wavefront and generates a spherical wavefront converging to a point on grating 14. Again, the image in camera 15 will be a flat uniform shade. The outer light rays are indicated for this case in solid lines on FIG. 3.

In FIG. 3, like in FIG. 2, rays are shown for a constant refractive index plate, as well as for the case where no optical component is mounted on the holder. It will be noted that the point convergence of the spherical wavefront for a constant refractive index gradient plate is offset on the grating compared to the point of convergence in the absence of an optical component. The same applies to an optical component having a constant refractive index and which is perfectly prismatic.

It is possible to accurately measure the reduced phase at some point on the grating, for example at the center. However, it is not possible in a setup like the one in FIG. 1 to make a difference between two successive lines of grating 14. In terms of phase, only a reduced phase can be measured leaving an uncertainly that is a multiple of 2π, corresponding to a whole number of grating lines.

In other terms, it is impossible to determine the number of grating lines that separate the point of convergence on the grating in the absence of an optical component (dashed lines on FIG. 3) and the point of convergence with a purely prismatic component (solid lines on FIG. 3).

The invention makes it possible to obtain a measurement of absolute phase at a point on the grating, and thus to remove this uncertainty at every point on the grating.

It applies to measurement of inclination or tilt of a wave surface, and thus makes it possible to determine the prism of a perfectly prismatic optical component, of any homogeneous optical component, or, yet again, the value of refractive index gradient of a plate having plane and parallel sides.

Figure 4:
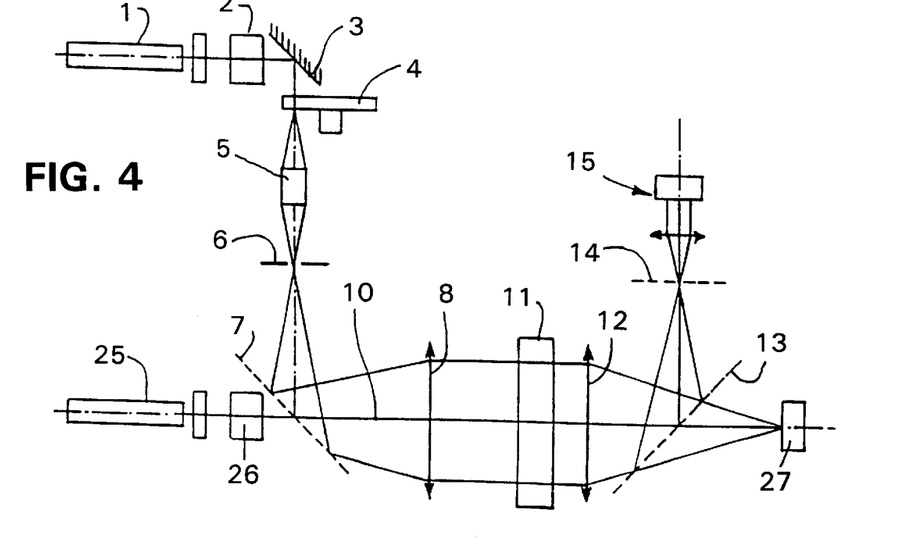
FIG. 4 is a diagrammatical view of the complete deflectometry apparatus, using transmission, for carrying out the invention.

FIG. 4 is a complete diagram of a deflectometry apparatus using transmission, for implementing the invention. On FIG.

4, the various elements described with reference to FIG. 1, can be seen. The setup in FIG. 4 additionally shows a laser for measuring aberration 25 and a shutter 26 which are symmetrical with means for generating a point light source with respect to semi-reflecting plate 7. The aberration measuring laser 25 and shutter 26 are designed to send a reference beam to the first lens 8.

In the setup in FIG. 4, this reference beam is sent along optical axis 10; it could also, as explained below, be sent parallel to the optical axis without coinciding with said axis. Instead of a laser for measuring aberration, and a shutter, one could also use any suitable device for materializing a reference beam, and, for example a simple pinhole placed in the field ahead of or following the optical component to be measured could be used.

The setup in FIG. 4 has a reference channel, comprising a camera for measuring aberration 27, symmetric with grating 14. The aberration-measuring camera is designed to receive, via semi-reflecting plate 13, the radiation transmitted by the second lens 12. Camera 27 is for example a CCD camera of the same type as camera 15. Advantageously, camera 27 is arranged perpendicular to the optical axis and can be arranged anywhere on said axis, depending on requirements. It can notably be arranged so as to be conjugate with the plane of said deflectometry means.

When shutter 2 of the laser for wavefront measurement is closed and shutter 26 of the aberration-measuring laser is open, aberration-measuring camera 27 provides an image of a spot corresponding to the reference beam sent by aberration-measuring laser 25. If there is no component on holder 11, in the setup of FIG. 4, this beam materializes the optical axis 10 of the setup. When an optical component is mounted on holder 11, transverse aberration of the para-axial ray materialized by the reference ray will be visualized by aberration-measuring camera 27.

The setup in FIG. 4 additionally comprises a phase measuring device, not shown, making it possible to measure reduced phases, in the grating plane. For the setup in FIG. 4, known optical components can be used, along with commercially-available CCD cameras.

The invention proposes determining the prism or slope of an optical component, by calculating absolute phase at a point on the deflectometry means.

We shall first describe the calibration, according to the invention, in a setup of the type shown in FIG. 4. For calibration, the invention starts out from the principle that a relation exists, for a given ray in the setup separated into two rays by semi-reflecting plate 13, between transverse aberration at aberration-measuring camera 27 and transverse aberration at grating 14. More generally, the invention sets out from the principle that a relation exists for any ray between transverse aberration as measured by the aberration-measuring means, and the slope of the ray in the deflectometry means plane. Calibration consist in establishing this relation.

In the embodiment which will be described below, the invention proposes establishing this relationship in the form of a linear function linking transverse aberration as measured by aberration-measuring means 27, and transverse aberration in the plane of grating 14. As explained above, this is particularly advantageous in the case of the Ronchi method, but one could also clearly establish a relationship between transverse aberration as measured, and the slope of the ray in the plane of grating 14.

The invention proposes calibrating the setup by fitting an optical component into the holder which is an optical component of revolution, with its optical center aligned on the axis of the setup, and then moving this component several times perpendicular to said optical axis and perpendicular to the grating lines, for different positions of the grating. More precisely, the invention proposes moving the optical component of revolution firstly along axis y when the grating lines are parallel to the direction z, and, following this, along the z axis after arranging the grating lines parallel to the y axis.

For each movement, variations in transverse aberration are calculated in the plane of grating 14, using a measurement of reduced phase, removing phase uncertainty by counting the number of fringes which follow one after the other during the movement; for each movement, one additionally measures variations in transverse aberration in the plane of the aberration-measuring camera 27. The relationship required can then be obtained from these measurements.

If we denote a pixel coordinate reference frame on aberration-measuring camera 27 image by (l, m), the axes of this reference frame are the axes of the CCD matrix of camera 27. This reference frame is not necessarily isotropic considering the presence of camera 27. An orthonormed reference frame, having coordinates in millimeters on grating 14 will be denoted by (p, q), one of the axes of this reference frame being parallel to the grating lines.

The origins (0,0) of these two reference frames correspond to the respective positions on camera 27 and grating 14, of the reference ray sent by aberration-measuring laser 25, in the absence of any component in the holder.

The invention proposes, in one embodiment, to establish a relationship, for a ray, between transverse aberration (l, m) at aberration-measuring camera 27, and transverse aberration (p, q) at grating 14, in the form of a matrix relationship:

$(p, q) = A \cdot {}^t(l, m)$ in which A is a square 2×2 matrix having four coefficients a, b, c, d, and which in its developed form gives:

$p = a \cdot l + b \cdot m$ $q = c \cdot l + d \cdot m$

This matrix is not simply an identity matrix, considering that camera 27 can be moved along the optical axis, the camera axes are not necessarily isotropic, and that the axes (p, q) and (l, m) are not necessarily exactly aligned. Other choices of relationship, reference points or origins are possible, as explained below.

Figure 5:
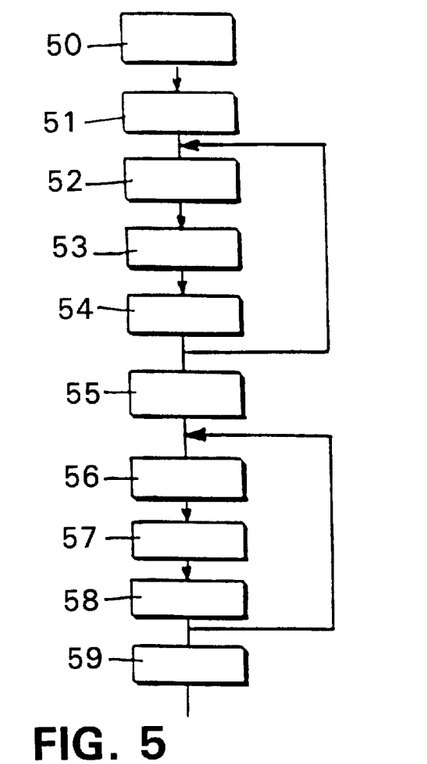
FIG. 5 is a flow chart showing the calibration process for the apparatus of the invention.

FIG. 5 shows a flow chart of the steps in calibrating the apparatus according to the invention. The setup is calibrated by determining the coefficients of matrix A using an optical component of revolution.

At step 50, the origins are fixed in the reference frames (p, q) and (l, m). To do this, it is ensured that there is no component in holder 11, shutter 2 is closed and shutter 26 is open. Grating 14 is positioned so that the reference ray does not fall on a line of the grating: a white image will be seen in camera 15, with a spot corresponding to laser beam 25. Manual or automatic acquisition on cameras 27 and 15 of the positions, in pixels, of the spot are obtained, these positions then being materialized by a cross or any other suitable means. Following this, shutter 26 is closed and shutter 22 opened. Using the phase measuring device, the reduced phase in the directions p and q at the origin in reference frame (p, q) is measured, this corresponding to the point materialized by a cross on the CCD matrix of camera 15. The phase measuring device is calibrated by moving the grating to a position where the reduced phase is zero, at the point of impact of the reference ray.

At step 51, an optical component or gauge, which is a body of revolution, is fitted into holder 11.

At step 52, shutter 2 is closed and shutter 26 opened. The laser beam 25 forms a spot on camera 27 which can be shifted with respect to the point of origin as determined at step 50: holder 11 is moved with a linear motion along axes y and z so as to bring the spot back to the cross materializing the origin of reference frame (l, m). In this way, the optical center of the optical gauge is placed on the reference ray, which, in the case of the setup in FIG. 4, coincides with optical axis 10. Within the limits of small adjustment errors, the reference ray passes through the optical center of the gauge and then arrives at the origin point of reference frame (p, q) on grating 14.

At step 53, shutter 26 is closed and shutter 2 open. A series of fringes now appears in camera 15. Holder 11 is moved with a linear motion along axis y so as to cause the cross materializing, on the CCD matrix of camera 15, the origin of reference frame (p, q) to move through a whole number n of fringes, this number then being stored. This is a relative integer, the sign of which is determined by noting the direction of movement of the spot on camera 27. Considering axes (p, q) and (l, m) are substantially aligned, the movement of the fringes only normally takes place in one direction when the component of revolution is moved.

Following this, the reduced phases $\phi_p$ and $\phi_q$ are measured in the directions p and q at the point of origin on reference frame (p, q), which corresponds to the point marked by a cross on the matrix of camera 15.

The absolute phase is zero at that point in reference frame (p, q) where the ray passing through the optical center of the optical gauge, in the form of a body of revolution, arrives. In this way, by knowing the number of fringes of the grating that have moved across the view in step 53, absolute phases $\Phi_p$ and $\Phi_q$ can be determined in the directions p and q at the point of origin in the reference frame (p, q) following step 53, using the following formulae:

$$\Phi_p = \phi_p + 2\pi.n$$

$$\Phi_q = \phi_q$$

Bearing in mind the properties of the Ronchi method, one can then determine, in millimeters on the grating plane, the coordinates P and Q along the axes p and q of the point of arrival of the reference ray, using the following formulae:

$$P = \Phi_p.R/2\pi$$

$$Q = \Phi_q.R/2\pi$$

in which R is the grating pitch, in millimeters.

One has thus determined the variations, in millimeters, of the position of the reference beam in the grating plane, after the movement in step 53.

In step 54, shutter 2 is closed and shutter 26 is opened. The beam of laser 25 forms a spot on camera 27 which is offset with respect to the point of origin: the coordinates (L, M,) in pixels of the spot are measured. In this way, the variations, in pixels, in the plane of camera 27 of the position of the reference ray are obtained, following the movement of step 53.

After step 54, the variations in position (L, M) of the point of arrival of the reference ray in the reference frame (l, m) are thus known for the movement performed at step 53, along with the corresponding variations (P, Q) in the point of arrival of the reference ray in the reference frame (p, q). One obviously obtains the relation:

$$(P, Q) = A.^t(L, M)$$

which supplies two equations having four unknowns a, b, c and d.

The values P, Q, L and M obtained are stored.

At step 55, the grating 14 is rotated through 90°.

Steps 56 to 58 correspond to the steps 52 to 54; however, the coordinate axes are exchanged one for the other to take account of the rotation of the grating, in other words, in the detailed relations with reference to steps 52 to 54, firstly P and Q are exchanged one for the other and, secondly, L and M are swopped.

The steps 52 to 54 can be repeated i times, or steps 56 to 58 can be repeated j times, by storing values $P_i$, $Q_i$, $L_i$ and $M_i$ or $P_j$, $Q_j$, $L_j$ and $M_j$ obtained on each occasion.

At step 59, 2.(i+j) equations having 4 unknowns a, b, c, and d are available. These equations are resolved using for example a conventional least-squares method, or a simple matrix inversion if i=j=1. One can also check the validity of the resolution of the equations, where a least-squares method is used, using a known method of evaluation.

One now is in possession of the value of the coefficients a, b, c and d for matrix A.

The validity of the coefficients obtained can be verified by calculating the value a.b+c.d. of $\sqrt{[(a^2+c^2)/(b^2+d^2)]}$ and of arctan(c/a). a.b+c.d should have zero value considering the symmetry of the setup, in rotation about the optical axis; $\sqrt{[(a^2+c^2)/(b^2+d^2)]}$ corresponds to the magnification ratio along the axes of camera 27; arctan(c/a) corresponds to the angle of inclination of the CCD matrix axes of camera 27 with respect to the lines of the grating.

Following calibration, a method is now available making it possible to calculate, for a given transverse aberration measured by the aberration measuring camera, transverse aberration, in millimeters, in the grating plane. As will be obvious to those skilled in the art, these various steps can be more or less automated, as a function of requirements.

This makes it possible, according to the invention, to remove uncertainty over phase, by determining an absolute phase at one point on the grating, as will now be explained.

Figure 6:
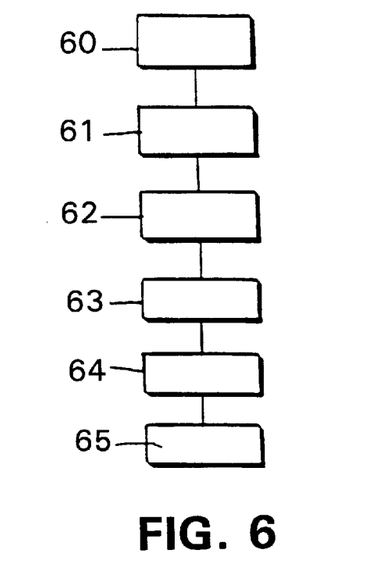
FIG. 6 is a flow chart of a measurement process according to the invention.

FIG. 6 is a flow chart of a measuring process according to the invention.

In order to remove uncertainty over phase, which is inherent in any fringe deflectometry method, the invention proposes to determine absolute phase at one point on the grating. For this, a measurement of reduced phase at the origin of reference frame (p, q) is made on grating 14.

Next, using the calibration information obtained, the coordinates of the point of impact of the reference beam on the grating are obtained. Knowing the grating pitch, it is easy to determine the number of grating lines between the origin of reference frame (p, q) and the point of impact of the reference ray. This makes it possible to calculate absolute phase at the origin of reference frame (p, q).

According to the invention, it is not necessary to calibrate the setup with a high degree of accuracy: the position of the point of impact of the reference ray only serves the purpose of removing uncertainty regarding absolute phase, but the accuracy of measurement is linked to measurement of reduced phase at the origin of reference frame (p, q). Stated in other terms, calibration accuracy of one half of grating pitch is sufficient, which explains why it is sufficient to locate the position of the reference ray on camera 27 with a degree of accuracy of one pixel.

We shall now give, with reference to FIG. 6, the various steps of measurement according to the invention.

At step 60, the component to be measured is fitted into the holder.

At step 61, shutter 2 is closed and shutter 26 is opened. The beam of laser 25 forms a spot on camera 27, this spot being offset with respect to the point of origin, to the extent to which the component exhibits prism: the coordinates $(L_o/M_o)$ of the spot are measured, in pixels. This gives the position of the reference ray, in pixels, in the plane of camera 27.

At step 62, starting from the matrix A obtained when the setup was being calibrated, the position $(P_o/Q_o)$ of the point of impact of the reference beam on grating 14 can be calculated inside reference frame (p, q), using the formulae:

$$(P_o, Q_o) = A.'(L_o, M_o)$$

By dividing $P_o$ and $Q_o$ by $R/2\pi$—the grating pitch divided by $2\pi$—an approximate value is obtained for absolute phase at the origin of reference frame (p, q) in the directions p and q: $P_o.2\pi/R$ and $Q_o.2\pi/R$.

At step 63, shutter 26 is closed and shutter 2 opened. The reduced phases, $\phi_p$ and $\phi_q$ are measured at the origin of reference frame (p, q) in the directions p and q, using the phase measuring device.

At step 64, the values $N_p$ and $N_q$ are calculated that minimize the quantities:

$$\phi_p + 2.\pi.N_p - P_o.2\pi/R$$

$$\phi_q + 2.\pi.N_q - Q_o.2\pi/R$$

Determining $N_p$ and $N_q$ makes it possible to calculate the absolute phases at the origin of reference frame (p, q) in the directions p and q, these being:

$$\Phi_p = \phi_p + 2.\pi.N_p$$

$$\Phi_q = \phi_q + 2.\pi.N_q$$

As explained above, and as the formulae demonstrate, absolute phase accuracy is given by the accuracy of relative phase measurement, and not by the accuracy obtained for $P_o$ and $Q_o$. It is sufficient to determine the integers $N_p$ and $N_q$ to an accuracy of 0.5.

At step 65, using a conventional Ronchi method, it is possible to determine a map of the wavefront slopes; knowing the absolute phase at the origin of the reference frame (p, q) obtained according to the invention, the slope maps can be integrated in order to determine the geometrical or optical structure of the component to be measured. One can thus calculate the prism of the optical component or the inclination of the wave surface reflected or transmitted by the component to be measured.

Advantageously, this is done as explained in the above-cited patents in the name of the present applicant, which are incorporated herein by reference. This gives the information being sought regarding the structure of the component being measured: refractive index gradient in a parallel-sided plate, unknown surface of a dioptric element, etc.

Figure 7:
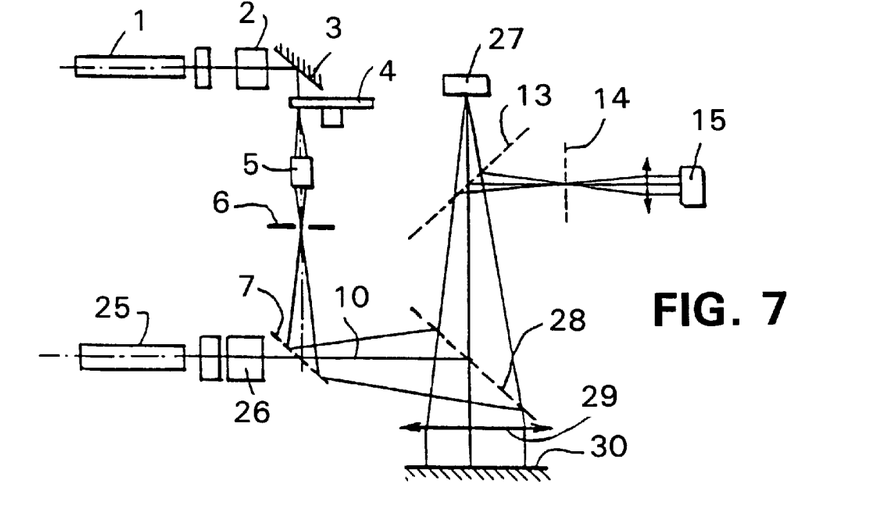
FIG. 7 is a diagram similar to that of FIG. 4, but for carrying out deflectometry using reflection.

FIG. 7 is a diagram similar to that in FIG. 4, but showing deflectometry using reflection. On FIG. 7, the elements 1, 2, 3, 4, 5, 6, 7, 10, 13, 14, 15, 25, 26, 27 similar to those in FIG. 4 will be recognized, these being identified by the same references.

The differences between the setups in FIGS. 4 and 7 are as follows: radiation from plate 7 arrives at semi-reflecting plate 28 which is inclined at 45° with respect to axis 10. Plate 28 redirects this radiation towards a lens (or objective) 29; the radiation leaving lens 29 is reflected at the component to be measured 30. The reflected radiation again passes through lens 29, and then plate 28, and arrives at a semi-reflecting plate 13.

The setup in FIG. 7 makes it possible to use the invention for reflection deflectometry, making it possible to avoid the auto-collimating step which was unavoidable in the prior art. A common setup can also be used, making it possible to simultaneously carry out measurement, using parts that are common and parts that are removable, by transmission and by reflection.

Obviously, the invention is not limited to the preferred embodiments described with reference to the figures.

Components other than a laser, a ground glass disc and microscope objective can be used for generating a high-quality monochromatic source. The means for illuminating the component with a radiation of known wavefront can be constituted otherwise than by a monochromatic source and an objective lens.

It is perfectly possible to illuminate the optical component to be analyzed with a known wavefront which is not a plane wavefront; deflectometry means other than a Ronchi grating can be employed, for example where a moiré method is used or another fringe deflectometry method: in such cases, it is necessary to determine absolute phase at at least one point on the grating.

A reference ray can also be materialized by a ray other than a para-axial ray, as is the case in the setup of FIG. 4; this only constitutes a modification to the phase reference in the plane of the deflectometry means. To materialize another ray, it is sufficient, for example, to arrange a laser close to point source pinhole 6, or to employ a simple hole, as described above. The measuring means described—the CCD camera—have the advantage of being simple while ensuring adequate accuracy: other means could also be chosen, and the aberration measuring camera could be replaced by a simple position detector.

The aberration measuring CCD camera is not necessarily in the conjugate plane of the grating. In order to change system dynamics as a function of the component to be measured, the camera can be moved along the optical axis, the only effect of which is to change the parameters of the calibration function.

In order to measure aberration transverse to the reference ray, means other than those described can be employed. In the devices of FIGS. 4 and 7, the semi-reflecting plate 13 is used to generate the reference channel and the deflectometry channel. This plate can be replaced by any device making it possible to orient the reflected or transmitted radiation from one channel to the other. In another embodiment one could even employ the camera 15 in the drawings for measuring transverse aberration, which would avoid using two channels after reflection or transmission at the component. It is sufficient, for example, to be able to swing grating 14 so that it is outside of the radiation when it is desired to measure aberration. It will then be necessary to move the CCD camera in order to observe the deflected ray inasmuch as the CCD plane is optically conjugate with the outlet face of the component to be measured.

The method described and claimed can advantageously be implemented using control means driven by a computer program, in order to provide more or less full automation of calibration and/or measurement. Again, the choice depends on the constraints encountered.

One can choose to write the relation between transverse aberration supplied by the aberration measuring means and the slope of the ray, or transverse aberration in the plane of said deflectometry means, in a form other than a matrix product, or by using different reference frames and coefficients: one can for example employ reference frames in (r, Θ) or a matrix constituted for coefficients (u, v ϑ) respectively corresponding, for orthogonal reference frames, to magnification along each of the two axes, and to the angular offset between these reference frames. These variations only involve modification to the formulae used for calculation, without departing from the teaching of the invention. One can choose a relation which is not linear, and for example modelled by a polynomial function of any desired degree. This only modifies the number of measurements necessary during calibration, and the calculation necessary on the basis of these measurements, to determine the relation.

The reference position for movement of the component of revolution during calibration can be a position different from alignment with the optical axis: again, this only introduces a variation in the phase reference.

Any desired optical component could be used for calibration, or standard prism gauges. If the component includes a torus, the axes of the torus can be aligned with the axes of the Ronchi grating.

Finally, instead of using a reference ray and several movements or standard prism gauges during calibration, one could also use several rays and one single movement or prism gauge.

The point of measurement of the reduced phase is advantageously fixed in the plane of the deflectometry means, and corresponds, in the embodiments described, to the intersection with the optical axis of the setup, as the reference ray materializes the para-axial ray. Other points or measurement methods can be chosen.

All these alternative embodiments can be combined or not, depending on the constraints applying to the objects to be analyzed by fringe deflectometry.

TRANSLATION OF LEGEND OF FIGURES

FIG. 5:

Step 50: calibrate origins, without optical component

Step 51: install a component of revolution;

Step 52: align the optical center of component on reference ray;

Step 53: move component and count fringes; measure relative phases calculate transverse aberration of reference ray in grating plane 14

Step 54: measure transverse aberration of reference ray in the plane of camera 27

Step 55: rotate grating through 900;

Step 56: like step 52

Step 57: like step 53

Step 58: like step 54

Step 59: calculate matrix for going from transverse aberration of reference ray in the plane of camera 27 to transverse aberration in the plane of grating 14

FIG. 6

Step 60: install a component to be measured

Step 61: measure transverse aberration of reference ray in the plane of camera 27

Step 62: calculate transverse aberration of reference ray in the plane of grating 14;

Step 63: measure reduced phases along optical axis in plane of grating 14;

Step 64: calculate absolute phase along optical axis in plane of grating 14;

Step 65: determine and integrate slope maps

What is claimed is:

1. Fringe deflectometry apparatus comprising:

an illuminating source arranged to direct radiation with a know wavefront onto an optical component to be measured;

deflectometry optics arranged to receive said radiation after reflection or transmission thereof by said optical component to be measured;

a reference ray source and detector arranged to permit measurement of transverse aberration of said reference ray after reflection or transmission thereof by said optical component to be measured; and an analyzer adapted to compute absolute phase at a point of the deflectometry optics.

2. The fringe deflectometry apparatus according to claim 1, wherein the reference ray detector is in a channel that is separate from said deflectometry optics.

3. The fringe deflectometry apparatus according to claim 1, wherein it comprises a semi-reflecting plate for directing radiation reflected or transmitted by said optical component to be measured firstly to said deflectometry optics and, secondly, to said reference ray detector.

4. The fringe deflectometry apparatus according to claim 1, wherein said reference ray detector is in a conjugate optical plane with the plane of said deflectometry optics.

5. The fringe deflectometry apparatus according to one of claim 1, wherein said reference ray detectors comprises a CCD camera and means for acquisition of the position of a spot on an image of said camera.

6. The fringe deflectometry apparatus according to claim 1, wherein said deflectometry optics comprise a Ronchi grating and means for analyzing fringes generated by said grating.

7. The fringe deflectometry apparatus according to claim 1, wherein said reference ray source comprises a laser symmetrical with said illumination source with respect to a semi-reflecting plate.

8. The fringe deflectometry apparatus according to one of claims 1 to 7, wherein said reference ray source is configured to materialize a para-axial ray.

9. A fringe deflectometry method comprising the steps of illuminating an optical component to be measured with radiation of known wavefront, and analyzing, in deflectometry means, the fringes generated by the radiation reflected or transmitted by said component, wherein it further comprises the steps of:

measuring, for a ray reflected or transmitted by said component, a reduced phase on said deflectometry means;

measuring transverse aberration of said ray;

calculating absolute phase of said ray by deflectometry means from measurement of said reduced phase, thereby removing uncertainty through measurement of said transverse aberration.

10. The fringe deflectometry method according to claim 9, wherein transverse aberration of said ray is measured in a reference channel which is different from the channel of said deflectometry means.

11. The fringe deflectometry method according to claim 9 or claim 10, wherein it comprises a calibration step consisting in determining a relation between transverse aberration of a ray reflected or transmitted by said component and the slope of said ray in said deflectometry means.

12. The fringe deflectometry method according to claim 11, wherein said calibration comprises the steps of:

illuminating an optical component of variable prism;

moving said component at least twice;

measuring, for each movement of said optical component, and for one ray, transverse aberration and reduced phase on said deflectometry means;

counting, for each displacement of said optical component the number of fringes that pass on said deflectometry means during said movement;

calculating, from said measured and counted values and for each movement of said optical component, a slope of said ray in said deflectometry means;

determining said relation from values of transverse aberration and slope, obtained for each movement.

13. The fringe deflectometry method according to claim 11, wherein said calibration step comprises carrying out at least twice, the steps consisting of:

illuminating an optical component of known prism;

measuring, for a ray, transverse aberration of a ray, and reduced phase on said deflectometry means;

calculating a slope of said ray in said deflectometry means from values measured and from a value of prism of said optical component;

and in that said relation is determined from the set of values for transverse aberration and slope thus obtained.

14. The fringe deflectometry method according to claim 10, wherein said fringe deflectometry method is a Ronchi method and in that is comprises a calibration stage consisting in determining a relation between transverse aberration of a ray in a reference channel and transverse aberration of said ray in said deflectometry means.

15. The fringe deflectometry method according to claim 14, wherein said calibration step comprises the steps of:

illuminating an optical component of variable prism;

moving said component at least twice;

measuring, for each movement of said optical component, and for a ray, transverse aberration in said reference channel and reduced phase on said deflectometry means;

counting, for each displacement of said optical component the number of fringes that pass on said deflectometry means during said movement;

calculating from said measured and counted values and for each movement of said optical component, a transverse aberration of said ray in said deflectometry means;

determining said relation from values for transverse aberration in said reference channel and for transverse aberration of said ray in said deflectometry means, obtained for each movement.

16. The fringe deflectometry method according to claim 14, wherein said calibration step comprises carrying out at least twice, the steps consisting of:

illuminating an optical component of known prism;

measuring, for a ray, transverse aberration of a ray, and reduced phase on said deflectometry means;

calculating a transverse aberration of said ray in said deflectometry means from values measured and a value of prism of said optical component;

and in that said relation is determined from the set of values thus obtained for transverse aberration in said reference channel and transverse aberration in said deflectometry.

17. The fringe deflectometry method according to claim 11, wherein said relation is a linear function.

18. The fringe deflectometry according to claim 17, wherein said optical component is moved at least twice.

19. Application of the method according to claim 9 to measurement of ophthalmic lenses, refractive index gradient lenses and molds for ophthalmic lenses.

20. The fringe deflectometry method according to claim 12, wherein said optical component is moved at least twice.

21. The fringe deflectometry method according to claim 15, wherein said optical component is moved at least twice.

* * * * *